United States Patent
Boutaghou et al.

[11] Patent Number: 5,414,574
[45] Date of Patent: May 9, 1995

[54] HYBRID BASE FOR ULTRATHIN DISK DRIVES

[75] Inventors: Zine E. Boutaghou; Sattar S. Malek, both of Rochester; Dean A. Richards, St. Charles, all of Minn.

[73] Assignee: International Business Machines, Corp., Armonk, N.Y.

[21] Appl. No.: 99,306

[22] Filed: Jul. 29, 1993

[51] Int. Cl.⁶ .................. G11B 5/012; G11B 17/02
[52] U.S. Cl. ........................... 360/97.01; 360/97.02
[58] Field of Search ............. 360/97.01, 97.02, 97.03, 360/137; 350/96.11

[56] References Cited

U.S. PATENT DOCUMENTS

| | | | |
|---|---|---|---|
| 4,772,974 | 9/1988 | Moon et al. | 360/97.03 |
| 4,810,048 | 3/1989 | Asano et al. | 350/96.11 |
| 4,825,316 | 4/1989 | Kishi et al. | 360/97.02 |
| 4,930,029 | 5/1990 | Morita | 360/97.01 |
| 4,965,691 | 10/1990 | Iftikar et al. | 360/133 |
| 4,980,786 | 12/1990 | O'Sullivan et al. | 360/97.03 |
| 5,025,336 | 6/1991 | Morehouse et al. | 360/97.02 |
| 5,029,026 | 7/1991 | Stefansky et al. | 360/97.02 |
| 5,264,975 | 11/1993 | Bajorek et al. | 360/97.02 |
| 5,282,099 | 1/1994 | Kawagoe et al. | 360/97.02 |

Primary Examiner—A. J. Heinz
Assistant Examiner—Allen Cao
Attorney, Agent, or Firm—Laurence R. Letson

[57] ABSTRACT

A hybrid base plate and electronic circuit board is disclosed for use in the low profile disk drives as used in computers. The hybrid base plate/circuit board is fabricated of a rigid metal insert serving as the base plate and an electronic circuit board, provided with an aperture configured to mate with the perimeter of the metal base plate. The metal base plate is electrically connected to the circuit board to provide grounding; and the circuit board provides support to the base plate, thus permitting the elimination of one thickness of the base plate and the separate circuit board as previously used in disk drives.

16 Claims, 1 Drawing Sheet

HYBRID BASE FOR ULTRATHIN DISK DRIVES

FIELD OF THE INVENTION

This invention relates to the fabrication and design of disk drive components and more specifically to the base plate and circuit board which form part of disk drives.

BACKGROUND OF THE INVENTION

Magnetic disk drives used for storing data, as used with computers for example, have been steadily reduced in size now that the 3.5 inch diameter floppy diskettes are widely utilized in personal computers, and the 2.5 inch hard disk drives are utilized in laptop and portable computers. Impetus for the height reduction comes from the lack of available space for larger drives, particularly in laptop and other small lightweight computers. With a desire for additional reduction of the hard disk to a diameter of approximately 1.8 inches, there is a commensurate effort to significantly reduce the thickness or height of the disk drive mechanism from approximately 10 millimeters dimension to approximately 5 millimeters.

Conventional construction of disk drives has utilized an electronic circuit board to support the electronic components necessary for control and operation of the disk drive and the related conventional function of recording data on magnetic media, as well as a rigid metal base plate for stability. The rigid metal base plate has been essential to the requirement that close control of the position of the magnetic head relative to the rotating disk to be precisely maintained. In order to prevent relative movement between the disk spindle and the axis of an actuator mechanism which positions the magnetic heads at varying positions relative to the disk surface, rigidity is essential. In order to provide a fixed datum from which the magnetic heads may be controlled for reading and writing of the data on the disk surface, the rigid base plate must maintain the orientation and spacing of the spindle and the actuator mechanism axis.

So that the head will not contact or impact the surface of the disk and thereby damage either the magnetic head or the disk during operation, any minute movement of the actuator mechanism support must be severely restricted relative to the spindle. This restriction is essential to maintain the extremely small gaps between the magnetic head and the disk surface in the order of a few microns.

Additionally, it is vital to maintain the extremely fine positioning between the magnetic head and the surface of the disk during operation. This fine positioning insures that the magnetic head remains at the necessary distance from the surface of the disk to read or write the data either from or to the magnetic media which is carried on the surface of the disk.

Reduction of the height of the disk drive enabling it to fit within the area normally used for memory cards, dictates the thickness of the various structural members of the disk drive can be reduced. The thickness of the components of the disk drive only may be reduced to a certain extent before the integrity of the component is lost. For example, the base plate must have a minimum thickness to remain sufficiently rigid. Techniques such as bending, forming or creasing the metal sheet add thickness to the part; this limits if not totally defeats, the effort to reduce part thickness of the part and/or disk drive height.

Conventional disk drives with the rigid metal base plate and the separate electronics board necessitate consumption of substantial height. When the electronics board and rigid metal base plate member are sandwiched closely together, the electronics will tend to warm the base plate and cause thermal expansion of the metal, possibly sufficient to warp or to deflect the rigid metal base plate; this warping will thus affect the spatial relationship of the actuator and the drive spindle thereby causing the magnetic heads to vary from their normal fly height. This variance either may displace the heads too far from the magnetic surface of the disk reliably to produce and/or reproduce stored data or places the magnetic heads too close to the disk surface and thus may cause the magnetic heads to contact or impact the moving disk surface, thus destroying a portion of the magnetic surface and data recorded thereon.

U.S. Pat. No. 5,025,336 to Morehouse et al., shows a stacked arrangement where the circuit board and base plate are arranged in face-to-face position with recesses in the base plate accommodating the electrical components on the circuit board.

U.S. Pat. No. 4,810,048 to Asano et al., describes a plastic or resin material which is molded to form a chassis which incorporates electrical wiring and conductors necessary to operate the electromechanical components mounted onto the chassis. When electrical conductors are deposited on the surface of the resin structure, they may be encapsulated with an insulating layer of material.

U.S. Pat. No. 4,825,316 to Kishi et al., shows and describes a structure wherein an electronic circuit board is at least partially engaged in face-to-face relationship with a sheet metal base place upon which the head transport mechanism is mounted and which also supports the spindle drive motor and spindle.

U.S. Pat. No. 4,930,029 to Morita illustrates a stacked arrangement wherein the electronic circuit board is mounted in a face-to-face relationship with the base or base plate which in turn supports the actuator mechanism and the spindle and spindle drive motor.

Utilizing two separate and stacked elements, the base plate and the electronic circuit board, causes valuable height to be sacrificed.

It is an object of this invention to maintain a rigid spatial relationship between the actuator mechanism and the disk drive spindle while eliminating cumulative height through the use of a hybrid plate.

It is a further object of this invention to reduce the affects of temperature within the disk drive housing and the resultant possible warping and deflection of the base plate.

A further object of this invention is to minimize the temperature rise within the disk drive assembly.

It is still another object of the invention to minimize contamination from the electronic components within the disk drive assembly.

SUMMARY OF THE INVENTION

A hybrid base plate/circuit board is used to eliminate height through the reduction of the height required for the metal base plate/circuit board and also to provide open accessible circuit board surfaces upon which to mount the electronic components necessary to control the operation of the disk drive assembly. The hybrid base plate/circuit board provides the opportunity to mount electronic components on both sides of the circuit board portion while the metal base plate portion provides the required rigidity essential to maintain the spatial relationship between the disk and the magnetic head supported by the actuator mechanism. The hybrid base plate/circuit board is fabricated from steel or similarly rigid metal plate, and the electronic board is fabricated to surround the perimeter of the metal base plate. The circuit board preferably is of an epoxy construction, such as the FR4 type circuit board, which has the sufficient degree of rigidity to support the base plate. The base plate, formed of steel or other suitable metal, is inserted into a mating hole in the electronic circuit board; the electronic circuit board ground plane is grounded and connected electrically to the metal base plate. The metal base plate is formed in a symmetrical shape about the axis that extends between the disk drive spindle axis and the axis of the actuator mechanism. The symmetry of the part reduces the affect of any thermal expansion resulting from temperature rise within the disk drive enclosure. The circuit board, particularly of the FR4 type, is less rigid than the metal base plate and will tend to accommodate or absorb thermal expansion of the base plate without being so rigid as to cause the metal base plate to warp or to deflect.

A more complete understanding of the invention may be had from the drawings and the detailed description of the invention to follow.

DRAWINGS

DETAILED DESCRIPTION OF THE PREFERRED EMBODIMENT OF THE BEST MODE CONTEMPLATED BY THE INVENTORS FOR CARRYING OUT THEIR INVENTION

Figure 1:
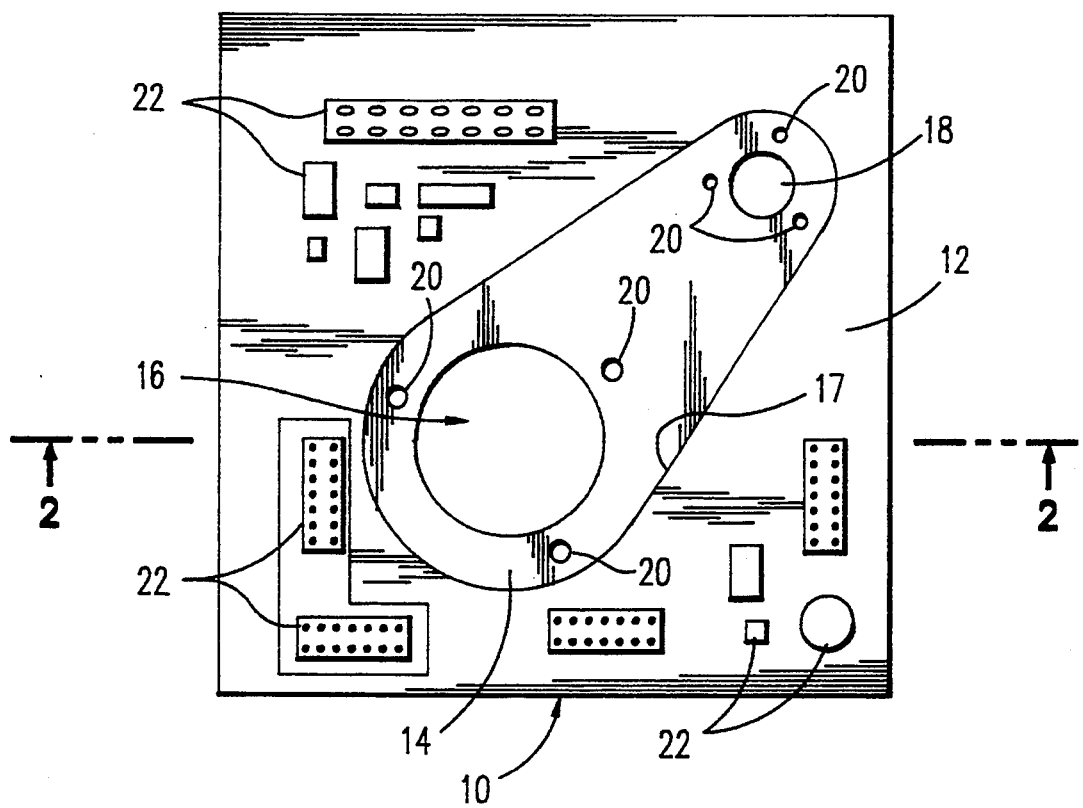
FIG. 1 illustrates a hybrid plate of an electronic card and base plate for use in a disk drive.

By eliminating duplicate thicknesses of material within the disk drive, the height of the disk drive may be substantially reduced. In FIG. 1, the hybrid base plate 10 for use in a disk drive is illustrated and comprises electronic circuit card 12 and rigid base plate 14. Referring first to the rigid base plate 14, this base plate 14 has been provided with a hole 16 to accommodate the spindle 34 and spindle drive motor 36, shown in FIG. 2, and a hole 18 for the accommodation of a voice coil motor driven actuator 42. The rigid base plate 14 may be a stamping of steel, stainless steel, or other sufficiently rigid metal. The mounting holes 16 and 18 together with attachment holes 20, which are used to bolt or to clamp the electromechanical devices to the base plate 14, all may be formed in a stamping and piercing operation.

The electronic circuit card 12 is fabricated by any of several different conventional processes and actually may be a single layer card, a double layer card, or a multi-layer card having internal electrical signal carrying layers. The fabrication of the electronic circuit card 12 is conventional and, therefore, does not form a part of this invention. The preferred structure of the electronic circuit card 12 is a multi-layer structure having electrical conductor patterns on both the top exposed surface 30 and bottom exposed surface 32 of the card 12 permitting mounting of electronic components 22 on the surfaces 30, 32, as seen in FIG. 2.

Figure 2:
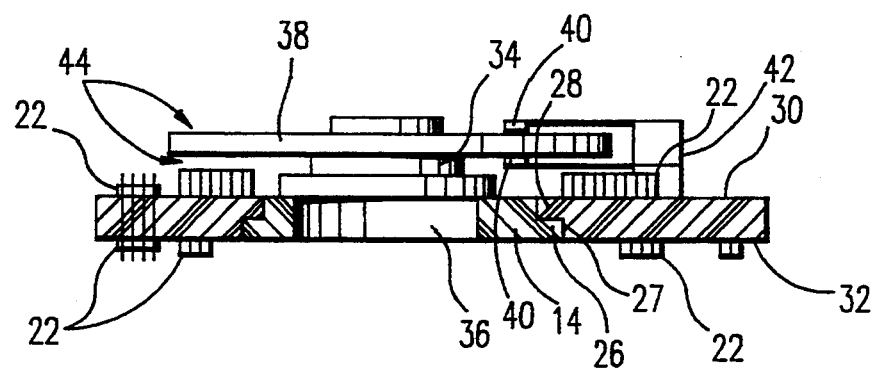
FIG. 2 is a sectional view of a disk drive incorporating the hybrid base plate along with a magnetic disk, spindle, and drive motor.

The vertical dimension of the hybrid base plate 10 comprised of electronic card 12 and base plate 14 are greatly enlarged and exaggerated in FIG. 2 within the disk drive shown in FIG. 2 with the disk drive cover removed and not shown.

Rigid base plate 14 is provided with a flange 26, which is substantially half the thickness of the base plate 14, that is extended from the perimeter of the full thickness of base plate 14. Flange 26 is instrumental to locate the rigid base plate 14 relative to the electronic card 12. Similarly electronic card 12 is fabricated to form a flange 28 that is extended inwardly to accommodate the rigid base plate 14. Flange 28 on the electronic card 12 similarly is approximately half the thickness of the electronic card 12. With the two flanges 26, 28 overlying one another and the rigid base plate 14 inserted into the hole 17 formed in the electronic card 12, the position of the rigid base plate 14 is defined. Since the rigid metal base plate 14 carries both an actuator 42 and a disk drive spindle 34, the relative position of the actuator 42 to the spindle 34 is maintained by the rigid structure of the metal base plate 14. The metal base plate 14 preferably is attached to the electronic card 12 either by molding or an adhesive operation. If molding is desired, the metal base plate 14 and the electronic card 12 may be assembled and inserted into a mold wherein a plastic type material of high strength may be molded and forced into any gap 27 between the base plate 14 and the electronic card 12 and, additionally, to overlie the junction line on both components 14, 12 to cause the two 14, 12 to be joined together permanently.

Should adhesion be the attachment mode desired, an adhesive material would be deposited on the mating surfaces of flanges 26, 28 and the two components 14, 12 would be assembled and pressed against each other while the adhesive cures.

The top surface 30 of the electronic card 12, as illustrated in FIG. 2, preferably is populated with electronic components 22 which exhibit a low outgassing characteristic or do not tend to give off contaminants when electrically energized; these components 22 are generally low level heat producers. By selecting electronic components 22 for the top surface 30 of the electronic card 12, the operating temperature rise within the disk drive is minimized and the potential for contamination within the disk drive enclosure is reduced substantially. It is crucial to minimize contamination in view of the extremely small clearance between the disk 38 surface and the magnetic head 40 floating or flying relative to the surface of the rotating disk 38.

Those components 22 which have a tendency to outgas or which have a tendency to give off particulate contaminants upon being energized, thus may be populated on the exterior or bottom surface 32 of electronic card 12. Similarly, those higher heat generating components 22 may be positioned on the bottom surface 32 of electronic card 12, thereby permitting the heat to be dissipated into a larger atmosphere wherein the temperature rise will be smaller and wherein any heat generated by the electronics components 22 will have a reduced affect on the expansion of the electronic card 12 and/or the base plate 14.

After the population of the electronic card 12 with the electrical components 22, the spindle 34, spindle drive motor 36 and magnetic disk 38 then may be installed onto the base plate 14 with the spindle drive motor 36 resident within the aperture 16, as illustrated in FIG. 2.

Similarly, the actuator 42 may be assembled and positioned within and relative to aperture 18 of the rigid base plate 14 as illustrated in FIG. 2.

Rigid base plate 14 is designed and fabricated to be generally symmetric about an axis extending through the centers of apertures 16 and 18. The symmetrical shape of the base plate 14 will reduce the affect of thermal expansion and contraction of the base plate 14 and accordingly will reduce any resultant bending or warping of the base plate 14 due to the thermal expansion thereof.

The electronic components 22 populated onto the surfaces 30, 32 of the electronic card 12 may be coated further with a spray or other suitable form of a plastic which, upon curing, then will form a continuous film over the electronic components 22. After being populated onto the electronic circuit board 12, coating the electronic components 22 contains any contaminants released from the electronic components 22 and prevents them from contaminating the area 44 around disk 38 and will reduce substantially the risk of damage to magnetic heads 40 or the magnetic disk 38.

The hybrid base plate 10/electronic card 12 described and illustrated herein enhances the compact design of disk drive mechanisms and eliminates the need for a stacked structure with the necessary spacing. The hybrid base plate 10 permits the electronic components 22 on the top surface 30 of the electronic card 12 to protrude into the region 44 around disk 38 where space permits in order to accommodate the components, which further eliminates the need for vertical height in the disk drive structure.

From the foregoing, it is apparent how the objects of the invention are accomplished and the shortcomings of the prior art overcome with the hybrid base plate/electronic card 10.

The foregoing description and the attached drawings are illustrative of the preferred embodiment but it should be understood that modifications and changes may be made without departing from the scope of the attached claims which define the invention.

We claim:

1. A magnetic disk drive apparatus comprising:
   a drive motor;
   a magnetic disk for recording and storing data;
   a head actuator mechanism for accessing a plurality of recording tracks on said disk; and
   a hybrid base plate/circuit board supporting said drive motor, magnetic disk and head actuator mechanism, said base plate/circuit board includes:
   a metal base plate having means for supporting said drive motor and said head actuator mechanism;
   a printed circuit board having an aperture corresponding to the perimeter of said base plate;
   said metal base plate disposed within said circuit board aperture so that the base plate perimeter abuts against sides of the aperture, said base plate and said circuit board joined together to form a single hybrid structure.

2. The hybrid base plate/circuit board of claim 1 wherein said metal base plate has apertures at opposite ends thereof said base plate being symmetrical about at least one axis, said axis extending between centers of said base plate apertures.

3. The hybrid base plate/circuit board of claim 1 wherein said metal base plate and said circuit board are disposed to be co-planar with each other.

4. The hybrid base plate/circuit board of claim 1 wherein said circuit board supports electronic components on both sides of said circuit board.

5. The hybrid base plate/circuit board of claim 1 wherein said metal base plate and said circuit board are electrically interconnected.

6. The hybrid base plate/circuit board of claim 1 wherein said metal base plate and said circuit board each are adhered to the other where said base plate perimeter and said circuit board join together.

7. The hybrid base plate/circuit board of claim 6 wherein said metal base plate and said circuit board each are adhered to the other where said base plate perimeter and said circuit board join by adhesive.

8. The hybrid base plate/circuit board of claim 6 wherein said metal base plate and said circuit board each are joined to the other where said base plate perimeter and said circuit board join together by an injected plastic material.

9. A magnetic disk drive for magnetically recording and storing data comprising:
   a drive motor;
   a magnetic disk for recording and storing data;
   a head actuator mechanism for accessing a plurality of recording tracks on said disk; and
   a hybrid base plate/circuit board supporting said drive motor, magnetic disk and head actuator mechanism, said base plate/circuit board includes:
   a metal base plate having means for supporting said drive motor and said head actuator mechanism, said base plate having a perimeter;
   a printed circuit board having an aperture corresponding to the perimeter of said base plate;
   said metal base plate disposed within said circuit board aperture so that the base plate perimeter abuts against sides of the aperture, said base plate and said circuit board joined together to form a single hybrid structure.

10. The disk drive of claim 9 wherein said metal base plate has apertures for mounting said spindle and said head actuator mechanism and is symmetrical about at least one axis, said axis extending between centers of said base plate apertures.

11. The disk drive of claim 9 wherein said metal base plate and said circuit board are disposed to be co-planar with each other.

12. The disk drive of claim 9 wherein said circuit board supports electronic components on both sides of said circuit board.

13. The disk drive of claim 9 wherein said metal base plate and said circuit board are electrically interconnected.

14. The disk drive of claim 9 wherein said metal base plate and said circuit board each are adhered to the other where said base plate perimeter and said circuit join together.

15. The disk drive of claim 14 wherein said metal base plate and said circuit board each are adhered to the other where said base plate perimeter and said circuit board join by adhesive.

16. The disk drive of claim 14 wherein said metal base plate and said circuit board each are joined to the other where said base plate perimeter and said circuit board join together by an injected plastic material.

* * * * *